(12) United States Patent
Biebricher et al.

(10) Patent No.: US 11,439,940 B2
(45) Date of Patent: *Sep. 13, 2022

(54) SEPARATION DEVICE AND OIL SEPARATING AIR FILTER ASSEMBLY COMPRISING SUCH SEPARATION DEVICE AS WELL AS METHOD FOR SEPARATING FLUID FROM A GAS STREAM DERIVING FROM A CONNECTING DEVICE

(71) Applicant: MANN+HUMMEL GmbH, Ludwigsburg (DE)

(72) Inventors: Peter Biebricher, Mannheim (DE); Bertram Bartelt, Steinheim (DE); Klemens Dworatzek, Edingen (DE); Fei Wang, Shanghai (CN); Sascha Roth, Schwegenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 336 days.

This patent is subject to a terminal disclaimer.

(21) Appl. No.: 16/740,698

(22) Filed: Jan. 13, 2020

(65) Prior Publication Data

US 2020/0222843 A1 Jul. 16, 2020

Related U.S. Application Data

(63) Continuation of application No. PCT/CN2017/092800, filed on Jul. 13, 2017.

(51) Int. Cl.
*B01D 46/00* (2022.01)
*B01D 46/24* (2006.01)
*B01D 46/62* (2022.01)

(52) U.S. Cl.
CPC ..... *B01D 46/0031* (2013.01); *B01D 46/0005* (2013.01); *B01D 46/2411* (2013.01); *B01D 46/62* (2022.01); *B01D 2265/029* (2013.01)

(58) Field of Classification Search
CPC .............. B01D 46/003; B01D 46/0031; B01D 46/2411; B01D 46/62; B01D 46/64;
(Continued)

(56) References Cited

U.S. PATENT DOCUMENTS 4,336,043 A * 6/1982 Aonuma .............. B01D 53/266
210/488
4,632,682 A * 12/1986 Erdmannsdorfer ..........................
B01D 46/2414
55/504

(Continued)

FOREIGN PATENT DOCUMENTS

CN 206234123 U 6/2017
DE 202008005672 U1 9/2009
(Continued)

*Primary Examiner* — Robert Clemente

(57) ABSTRACT

A separation device for separating fluid from a gas stream has a housing replaceably connected to a connector head of a connecting device. The housing has a housing corpus with an axial end covered by a housing cover non-detachably connected to the housing corpus. A filter insert is received in the housing in a flow path of the gas stream from a raw gas inlet to a clean gas outlet of the housing. The filter insert has a main separator element with ring-shaped support body and cylindrical coalescing filter medium with coalescer material removing fluid from the gas stream. A preliminary separator element is arranged concentrically to the main separator element in the housing in the flow path of the gas stream between raw gas inlet and main separator element. The preliminary separator element has a cylindrical coalescing filter medium with coalescer material removing fluid from the gas stream.

18 Claims, 6 Drawing Sheets

(58) Field of Classification Search
CPC ............ B01D 46/645; B01D 2265/029; B01D 46/0005; B01D 46/0015
See application file for complete search history.

(56) References Cited

U.S. PATENT DOCUMENTS

| | | | |
|---|---|---|---|
| 4,692,175 A | 9/1987 | Frantz | |
| 4,878,929 A | 11/1989 | Tofsland et al. | |
| 5,660,607 A * | 8/1997 | Jokschas | B01D 46/2411 55/498 |
| 5,800,584 A * | 9/1998 | Hinderer | B01D 46/24 55/482 |
| 5,961,678 A * | 10/1999 | Pruette | B01D 46/2414 55/528 |
| 6,093,231 A * | 7/2000 | Read | B01D 46/64 55/508 |
| 2006/0123743 A1 | 6/2006 | Heer | |
| 2009/0242470 A1 * | 10/2009 | Muenkel | F01M 13/04 210/236 |
| 2013/0233400 A1 * | 9/2013 | Dworatzek | B01D 27/106 137/15.01 |
| 2014/0157738 A1 * | 6/2014 | Eberle | B01D 46/0005 55/482 |
| 2015/0101293 A1 * | 4/2015 | Dworatzek | B01D 46/2414 55/423 |
| 2016/0030870 A1 | 2/2016 | Schmelzle et al. | |
| 2018/0104632 A1 * | 4/2018 | Schmelzle | B01D 46/2411 |
| 2018/0243676 A1 * | 8/2018 | Bartelt | B01D 46/0031 |
| 2018/0333670 A1 * | 11/2018 | Zinic | B01D 46/0015 |
| 2020/0224649 A1 * | 7/2020 | Biebricher | B01D 46/0015 |

FOREIGN PATENT DOCUMENTS

| | | |
|---|---|---|
| DE | 102011108061 A1 | 1/2013 |
| EP | 0814891 B1 | 1/1998 |
| EP | 2105184 B1 | 9/2009 |
| EP | 2471588 B1 | 7/2012 |
| GB | 1238843 A | 7/1971 |

* cited by examiner

SEPARATION DEVICE AND OIL SEPARATING AIR FILTER ASSEMBLY COMPRISING SUCH SEPARATION DEVICE AS WELL AS METHOD FOR SEPARATING FLUID FROM A GAS STREAM DERIVING FROM A CONNECTING DEVICE

CROSS-REFERENCE TO RELATED APPLICATIONS

This application is a continuation application of international application No. PCT/CN2017/092800 having an international filing date of 13 Jul. 2017 and designating the United States, the entire contents of the aforesaid international application being incorporated herein by reference.

TECHNICAL FIELD

The present invention relates to a separation device, in particular to a spin-on filter, for separating fluid, in particular oil, from a gas stream, in particular from an air stream, for example from a compressed air stream, of a connecting device, in particular of a compressor, of a compressed air system or of a vacuum pump.

BACKGROUND OF THE INVENTION

Prior art document EP 0 814 891 B1 discloses an air de-oiling separator comprising an interchangeable filter insert with a prefiltering web. The interchangeable filter insert comprises a flange for arranging the interchangeable filter in a pressure vessel. In EP 0 814 891 B1 the filter insert by itself is a replaceable unit. This filter insert is designed for being replaceably received in a housing.

In case of spin-on separation devices, as a rule the filter housing cannot be opened, i. e., the housing cover is non-detachably connected to the housing. Thus, the spin-on filter as a whole forms a replaceable unit. The design of a spin-on filter is therefore also referred to as a replacement filter.

A separation device, in particular a spin-on filter, of the aforementioned kind is disclosed in prior art document DE 10 2011 10 80 61 A1. The preliminary separator element of the separation device differs from the separation device of the present invention in that the prior art preliminary separator element acts by changing the gas flow direction due to the preliminary separator element geometry, e. g. blade geometry. According to DE 10 2011 10 80 61 A1 the preliminary separation occurs by inertia of the fluid due to the redirection of the gas flow. The preliminary separator element disclosed in DE 10 2011 10 80 61 A1 is voluminous and expensive to produce.

SUMMARY OF THE INVENTION

The present invention relates to a separation device, in particular to a spin-on filter, for separating fluid, in particular oil, from a gas stream, in particular from an air stream, for example from a compressed air stream, of a connecting device, in particular of a compressor, of a compressed air system or of a vacuum pump.

The separation device comprises a housing being designed to be replaceably connected with the connecting device, in particular to be spinned on the connecting device. A hollow cylindrical filter insert is received in the housing in the flow path of the gas stream between at least one raw gas inlet and at least one clean gas outlet. The raw gas inlet is designed for supplying raw gas or for supplying gas to be separated from fluid. The clean gas outlet is designed for exhausting clean gas or for exhausting separated gas. The raw gas inlet and the clean gas outlet are advantageously arranged at the housing cover.

An axis, in particular an assembly axis for mounting the separation device to the connection device, extends longitudinally through the housing corpus and defines an axial direction. The housing comprises a cup-shaped housing corpus and a housing cover for covering a first axial end of the housing corpus. The housing cover is non-detachably connected to the housing corpus, i. e., the housing cover is connected to the housing corpus in such way that the housing cover cannot be disconnected from the housing corpus without destroying the housing corpus and/or the housing cover.

The filter insert comprises at least one main separator element comprising at least one coalescing filter medium being designed for separating the housing into a raw side and a clean side. The term main separator element is used in the context of this application to mean "filter body" and is to be understood as the part of a filter insert arranged in the housing and producing the main separation effect. The filter insert further comprises a ring-shaped support body for supporting the coalescing filter medium of the main separator element.

The separation device further comprises at least one preliminary separator element being arranged in the housing in the flow path of the gas stream between the raw gas inlet and the main separator element. Thus, the separation device is arranged upstream of the main separator element in the direction of the flow path. The raw gas inlet is arranged at the raw side of the housing and the clean gas outlet is arranged at the clean side of the housing.

The present invention further relates to an oil separating air filter assembly comprising at least one separation device of the aforementioned kind and at least one connecting part, in particular at least one connection nipple or connection tube or threaded pipe stub, being designed for connecting the separation device with a connector head of the connecting device, wherein the connecting part is arranged within the clean gas outlet of the separation device, and wherein the connecting part comprises at least one connecting element, in particular at least one threaded pipe stub, for connecting the separation device with the connector head and at least one clean gas conducting element, in particular at least one nipple or tube, comprising at least one gas-conducting inner space for conducting separated clean gas from the clean side of the separation device to the connector head of the connecting device.

The present invention also relates to a method for separating fluid, in particular oil, from a gas stream, in particular from an air stream, for example from a compressed air stream, deriving from a connecting device, in particular from a compressor, from a compressed air system or from a vacuum pump, (i) wherein the gas stream to be separated from fluid is flowing into a housing of a separation device through at least one raw gas inlet of the housing, the housing being replaceably connectable with a connector head of the connecting device, (ii) wherein in the housing the gas stream is flowing through at least one preliminary separator element being arranged in the flow path of the gas stream between the raw gas inlet and at least one main separator element, (iii) wherein, after passing through the preliminary separator element, the gas stream is flowing radially through the main separator element, the main separator element being arranged in the housing in the flow path of the gas stream between the preliminary separator element and at least one clean gas outlet out of the housing, wherein the main separator element is acting as a coalescer for removing fluid, in particular oil, from the gas stream and separates the housing into a raw side and a clean side.

Starting from the disadvantages and shortcomings as described earlier and taking the prior art as discussed into account, an object of the present invention is to further develop a separation device of the kind as described in the technical field, an oil separating air filter assembly of the kind as described in the technical field, and a method of the kind as described in the technical field in such way that a preliminary separation of the gas stream having streamed into the housing by the raw gas inlet is provided with low costs and low volume. In particular it is an object of the present invention to further develop a separation device of the kind as described in the technical field such that the separation device is designed in a compact manner and is inexpensive and easy to manufacture.

The object of the present invention is achieved by a separation device of the aforementioned kind that, in accordance with the present invention, is characterized in that the preliminary separator element comprises a hollow cylindrical coalescing filter medium comprising at least one coalescer material for removing fluid from the gas stream, wherein the preliminary separator element is arranged concentrically to the main separator element.

The object of the present invention is achieved by an oil separating air filter assembly of the aforementioned kind that comprises, in accordance with the present invention, the separation device embodied in accordance with the present invention.

The object of the present invention is achieved by a method of the aforementioned kind, wherein, in accordance with the present invention, the gas stream is flowing radially through the preliminary separator element, wherein the preliminary separator element is acting as a coalescer for removing fluid, in particular oil, from the gas stream.

Advantageous embodiments and expedient improvements of the present invention are disclosed in the respective dependent claims.

The present invention is principally based on the idea of providing a separation device of the kind as described in the technical field with at least one preliminary separator element comprising at least one coalescing filter medium, in particular at least one preliminary filter mat. The preliminary separator element comprises, in particular consists of, a ring-shaped or hollow cylindrical coalescing filter medium being arranged concentrically or coaxial to the main separator element. The preliminary separator element according to the present invention acts as a coalescer.

The preliminary separator element comprising at least one coalescing filter medium enables that the amount of fluid arriving at the main separator element is reduced or at least exists in a more usable form, e. g. the fluid comprises larger drops and/or the gas stream comprising the fluid to be separated flows through the main separator element with a preferably more uniform flow distribution. This leads to the advantage that the separation device according to the invention has an increased degree of separation.

The coalescing filter medium advantageously essentially comprises nonwoven filter material, in particular nonwoven fabric, for example fibrous nonwoven fabric, such as fibrous nonwoven fabric made of polyester.

According to a preferred embodiment of the present invention, the preliminary separator element has a smaller flow resistance than the coalescing filter medium of the main separator element.

Independently thereof or in combination therewith, according to a preferred embodiment of the present invention the coalescer material of the preliminary separator element has a smaller coating weight per unit area and/or a higher fiber coarseness than the coalescing filter medium of the main separator element.

For the present invention, the main separator element is advantageously designed as a filter wrap, i.e. at least one filter medium, for example non-woven filter material, which is wound a plurality of times about a ring-shaped support body, in particular about a perforated support tube. The coalescer material of the main separator element is advantageously a glass fiber material.

The preliminary separator element and the main separator element are arranged in succession in direction of the flow path. The ring-shaped coalescing filter medium of the preliminary separator element can be, for example, nonwoven filter material. The arrangement of the hollow cylindrical preliminary separator element concentrically to the hollow cylindrical main separator element leads to the advantage that the separation device is designed in a very compact manner.

According to an advantageous embodiment of the present invention, the filter insert comprises at least one first end disc and at least one second end disc disposed on opposite axial end face sides of the filter insert. The first end disc faces the housing cover and the second end disc faces away from the housing cover. The first end disc comprises a radially outer peripheral wall element extending over the main separator element in axial direction. In other words, the radially outer peripheral wall element is surrounding the main separator element. The radially outer peripheral wall element of the first end disc aims for fixing the main separator element to the first end disc. The main separator element can be, for example, fixed to the first end disc by glue being arranged at the side of the first end disc facing the main separator element.

Advantageously, the preliminary separator element is disposed with regard to the axis radially outward from the radially outer peripheral wall element of the first end disc. In other words, the preliminary separator element advantageously overlaps the radially outer peripheral wall element of the first end disc in radial direction. This leads to the effect that the fluid separated by the preliminary separator element passes by the radially outer peripheral wall element of the first end disc and collects at the raw side of the separation device. Thus, the fluid separated by the preliminary separator element does not flow to an area of the filter insert being surrounded by the radially outer peripheral wall element of the first end disc and consequently does not flow into the clean side of the separation device. By disposing the preliminary separator element with regard to the axis radially outward from the radially outer peripheral wall element of the first end disc, the overall performance of the separation device can be increased.

The housing advantageously comprises at least one raw side collecting area for collecting, under the influence of gravity, fluid being separated by the preliminary separator element. The raw gas inlet is advantageously designed in such way that fluid being collected at the raw side collecting area flows under the influence of gravity through at least one fluid outlet being arranged at the raw side of the housing, in particular through the raw gas inlet, out of the separation device. This leads to the advantage that the separated fluid can directly drop back into the original room where it derives from. Surprisingly, only an insignificant part of the separated fluid is reabsorbed by the flow path and the re-entrainment of the fluid collected in the raw side collecting area is insignificantly low. Thus, the separation efficiency of the separation device is increased, the gas stream flowing through the raw side collecting area notwithstanding.

After having passed the raw gas inlet, the fluid may enter a fluid chamber of the connecting device.

The separation device is advantageously designed such that the fluid level of the fluid collected in the raw side collecting area is arranged geodetical below the first end disc.

The housing advantageously comprises at least one clean side collecting area for collecting, under the influence of gravity, fluid being separated by the main separator element. The fluid being collected at the clean side collecting area is advantageously flowing out of the separation device, under the influence of gravity, air flow and/or local pressure difference, through at least one fluid outlet being arranged at the clean side of the housing, in particular at the clean gas outlet.

Independently thereof or in combination therewith, according to a preferred embodiment of the present invention the second end disc comprises a radially outer peripheral wall element surrounding the preliminary separator element and extending over the preliminary separator element in axial direction. In other words, the preliminary separator element can be disposed with regard to the assembly axis radially inward from the radially outer peripheral wall element of the second end disc. This leads to the advantage that the second end disc can be used for fixing the preliminary separator element at the filter insert. For example, the preliminary separator element can be fixed to the second end disc by means of glue being arranged at the side of the second end disc facing the preliminary separator element. In combination with the glue connection or as an alternative thereto, the preliminary separator element can be fixed to the second end disc by means of at least one clamping connection, for example, by means of at least one flare joint.

The preliminary separator element can be arranged detachably, for example loose, at the radially outer peripheral wall element of the first end disc.

Advantageously the preliminary separator element abuts against the radially outer peripheral wall element of the first end disc in such way that it is elastically fixed at the radially outer peripheral wall element of the first end disc. In particular the preliminary separator element can tightly fit with slight tension on the radially outer peripheral wall element of the first end disc. For example, the preliminary separator element can cover the first end disc like a stocking or a sock.

Alternatively, the preliminary separator element can be fixed to the radially outer peripheral wall element of the first end disc non-detachably, for example, by means of glue.

The raw gas inlet is arranged at the raw side of the housing and the clean gas outlet is arranged at the clean side of the housing. According to an advantageous embodiment of the invention, the raw gas inlet and/or the clean gas outlet are arranged at the housing cover.

The preliminary separator element is advantageously arranged concentrically to the main separator element and is configured to be flowed through radially by the gas stream or by the flow path.

In order for the raw gas having streamed into the housing via the raw gas inlet to distribute essentially over the whole axial length of the housing inside and to stream into the preliminary separator element at an area that is optimal for the flow path depending on decrease in pressure, according to an advantageous embodiment of the present invention, there is a gap between the radial wall of the housing corpus and the preliminary separator element.

For connecting the separation device with the connecting device, the housing cover is advantageously designed to be replaceable mounted onto a connecting part. In particular the housing cover comprises a central hole being designed for passing through the connecting part, wherein the connecting part comprises at least one connecting element being replaceably connectable with the separation device as well as with the connector head, and at least one clean gas conducting element for conducting clean gas from the separation device to the connector head. For example, the clean gas outlet can be a central threaded hole of the housing cover, wherein the threaded hole is designed to be screwed onto a threaded pipe stub firmly fixable on a connector head of the connecting device.

The oil droplets having been separated by the main separator coalescing element and the oil droplets having been separated by an optional secondary separator element flow downward following gravity, working pressure and/or vacuum and pass advantageously through at least one coaxial fluid outlet of the connecting part into at least one oil outlet channel of the connector head.

The present invention in particular relates to the use of at least one separation device as described above and/or of at least one oil separating air filter assembly as described above and/or of the method as described above for separating oil from a compressed air stream deriving from a compressor, from a compressed air system or from a vacuum pump.

BRIEF DESCRIPTION OF THE DRAWINGS

As already discussed above, there are several options to embody as well as to improve the teaching of the present invention in an advantageous manner. To this aim, reference is made to the claims. Further improvements, features, and advantages of the present invention are explained below in more detail with reference to a preferred embodiment by way of example and with reference to the accompanying drawings.

The same reference numerals are used for corresponding parts in FIG. 1 to FIG. 6.

DESCRIPTION OF PREFERRED EMBODIMENTS

In order to avoid unnecessary repetitions, the following description regarding the embodiments, characteristics, and advantages of the present invention relate to (unless stated otherwise)

- the first embodiment of the oil separating air filter assembly according to the present invention (cf. FIGS. 1 to 4) as well as
- the second embodiment of the oil separating air filter assembly according to the present invention (cf. FIG. 5) as well as
- the first embodiment of the separation device 100 according to the present invention (cf. FIGS. 1 to 4) as well as
- the second embodiment of the separation device 100' according to the present invention (cf. FIG. 5), all embodiments 100, 100' being operated according to the method of the present invention.

Figure 1:
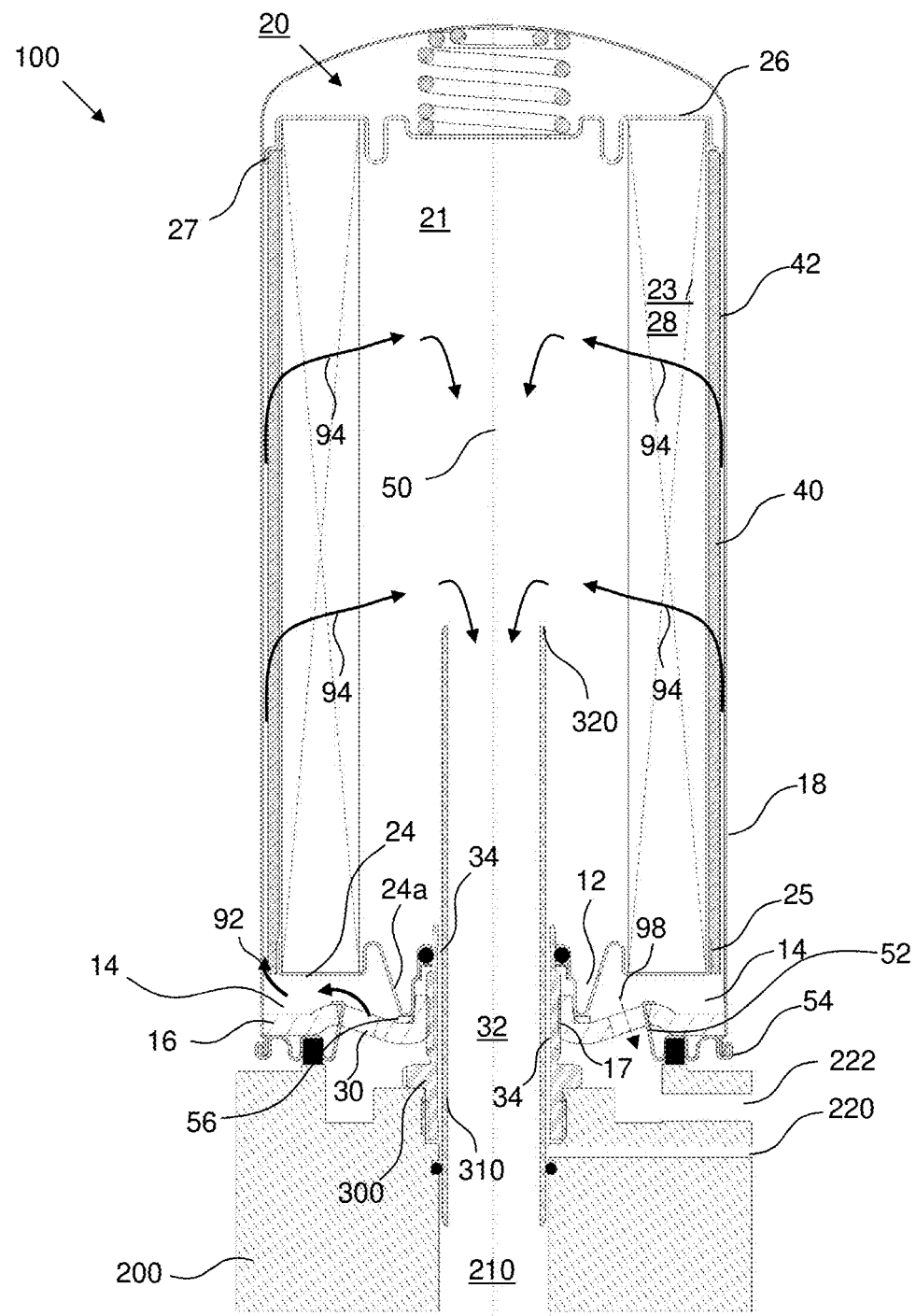
FIG. 1 shows a first exemplary embodiment of an oil separating air filter assembly comprising a separation device according to a first exemplary embodiment of the present invention, wherein the separation device is working according to the method of the present invention.

FIG. 1 shows a first embodiment of an oil separating air filter assembly according to the present invention, serving for the separation from the air of such oil as is carried with the air. The oil separating air filter assembly is used, for example, in compressors, vacuum pumps compressed air systems or the like. It can be disposed before the inlet or after the outlet of a corresponding unit.

The oil separating air filter assembly depicted in FIG. 1 comprises a first embodiment of the separation device 100 according to the present invention, which can also be referred to as a spin-on air de-oiling box or an air/oil separator box. The spin-on air de-oiling box 100 is replaceably fixed on a connector head 200, at the bottom of FIG. 1. The connector head 200 serves as a connection element for corresponding air lines and oil lines for connecting with a corresponding connecting device, in particular with a compressor, with a compressed air system or with a vacuum pump.

A connecting part 300, 310, in particular a connection nipple or connection tube, for example, of a threaded pipe stub or threaded connection nipple or threaded connection tube, such as a hollow, pipe stub-like connection nipple 300, 310, connects the spin-on air de-oiling box 100 with the connector head 200. The connection nipple 300, 310 comprises

- a connecting element 300, in particular a threaded pipe stub, for connecting the separation device 100, 100' with the connector head 200 and
- a clean gas conducting element 310, in particular at least one nipple or tube, comprising at least one gas-conducting, in particular air-conducting, inner space.

The spin-on air de-oiling box 100 comprises a housing with a cup-shaped corpus 18 and a housing cover 16 for closing an opening of the housing corpus 18. The housing corpus 18 and the housing cover 16 are made, for example, of metal. Alternatively, at least one of the two components can be made from another material, for example, plastic, or at least have another material.

Figure 3:
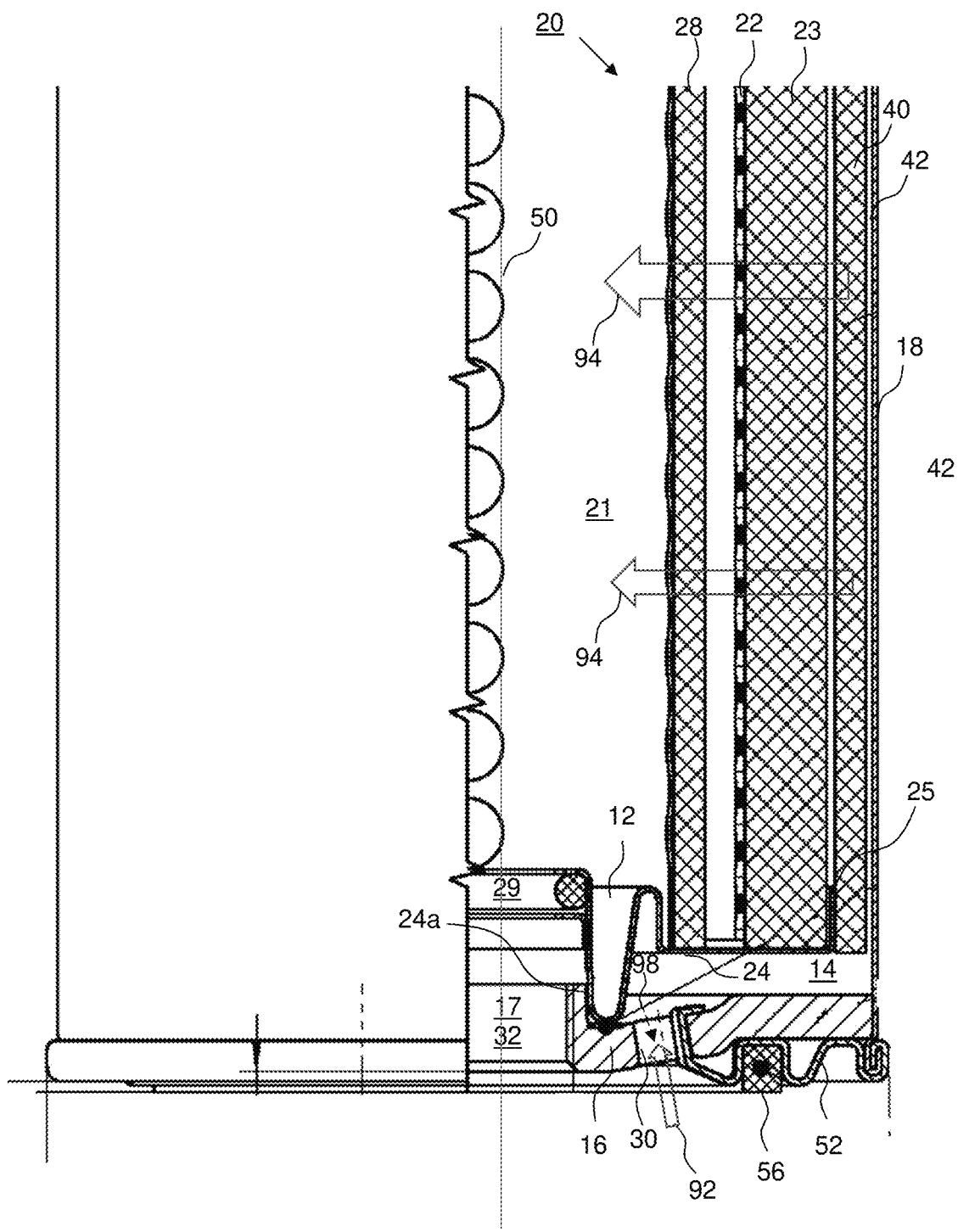
FIG. 3 shows a detail view of the separation device of FIG. 1.
Figure 6:
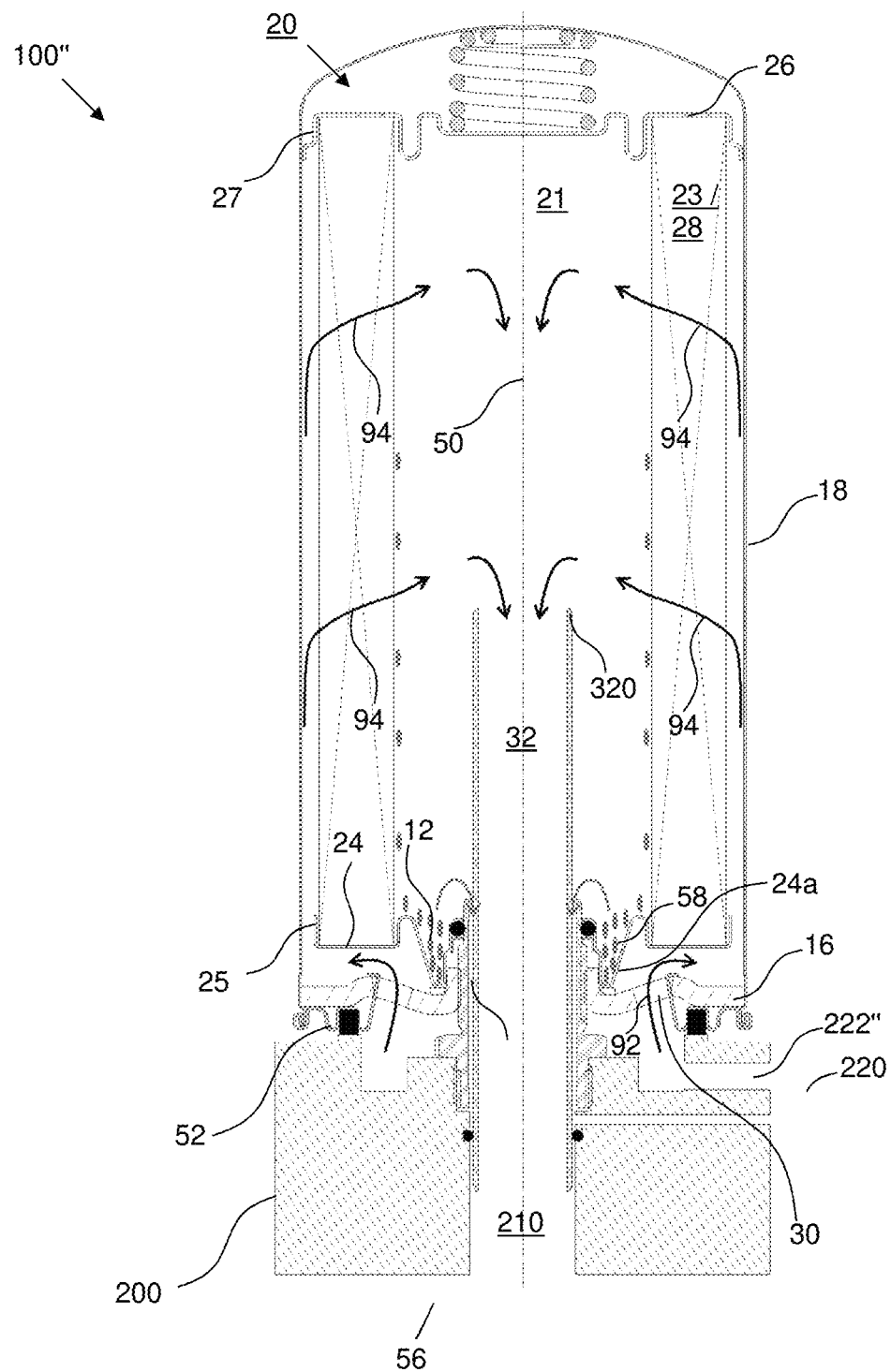
FIG. 6 shows an oil separating air filter assembly according to prior art.

A hollow cylindrical filter insert 20 is disposed in the housing 16, 18 in the flow path of the gas stream between at least one raw gas inlet 30 and at least one clean gas outlet 32. The filter insert 20 is configured to be flowed through radially by the gas stream as depicted in FIGS. 3 and 6. The filter insert 20 comprises a main separator element 22, 23 designed as a ring-shaped coalescing element. The main separator element comprises a coalescing filter medium 23 and a ring-shaped support body 22 for supporting the coalescing filter medium 23. By way of example, the main separator element has as a filter medium a glass fiber mat 23, which is repeatedly annularly wrapped and bounded by a first end disc or by a lower end plate 24 facing the connector head 200 and a second end disc 26 or an upper end plate 26 facing away from the connector head 200.

As a secondary separator element 28 (cf. FIGS. 2 and 3) a further filter medium, for example, a non-woven material, can be disposed in the interior of the glass fiber wrap 23 of the main separator element of the filter insert 20.

The filter insert 20 moreover comprises a preliminary separator element 40 (cf. FIGS. 1 to 5) comprising a coalescing filter medium, namely a non-woven filter material or a mat, for example, a glass fiber mat 40. The mat 40 can be repeatedly annularly wrapped and bounded by the upper end plate 26.

In the assembled state shown in FIGS. 1 to 5, the radially outer circumferential side of the preliminary separator element 40 is spaced apart from the radially inner circumferential side of the housing corpus 18 such that an annular gap 42 arises between the corresponding circumferential sides as a passage for the raw gas.

In general, the spin-on air de-oiling box 100, 100', 100" is ready for use as disposed in the orientation shown in FIGS. 1 to 6. It can, however, also be disposed in other orientations. When further reference is made to "below," "above," or similar, this refers unless otherwise stated to the representation in FIGS. 1, 2, 3, 5 and 6.

In an operation-ready assembly, the housing corpus 18, the filter insert 20, and the connection nipple 300, 310 are respectively coaxial with an imaginary assembly axis 50. The spin-on air de-oiling box 100, 100', 100" can be screwed onto the connector head 200 and unscrewed therefrom about the assembly axis 50 by means of the connecting element 300 of the connection nipple 300, 310.

When in this document reference is made to "radial," "axial," "coaxial", "concentrically" or "circumferential" or the like, this refers to the assembly axis 50, unless stated otherwise.

The lower end plate 24 facing the housing cover 16 is approximately annular. It has a coaxial pass-through opening 29 (cf. FIGS. 2 and 3) for the connection nipple 300, 310. Radially between the pass-through opening 29 and the secondary separator element 28 of the filter insert 20, the lower end plate 24 is repeatedly bent such that there is a circumferential annular trough 24a, which opens toward the element interior 21 of the filter insert 20. The trough 24a can serve as a clean side collecting area 12 for collecting, under the influence of gravity, fluid being separated by the main separator element.

The radially inner edge of the lower end plate 24 surrounds the pass-through opening 29. It points toward the element interior 21.

The connecting part 300, 310 comprises a connecting element 300 and at least one clean gas conducting part 310. An inner diameter of the connecting element 300 is larger than an outer diameter of the clean gas conducting part 310. Between the radially outer peripheral wall of the clean gas conducting part 310 and the radially inner edge of the connecting element 300, an annular, coaxial fluid outlet 34, for example, a passage gap, remains for the oil separated by the main separator coalescing filter medium 23 and/or by the secondary separator element 28.

The raw gas inlet 30 serves as outlet for the oil being separated by the preliminary separator element 40.

The interior of the connection nipple 300, 310 extends through the clean gas outlet 32 of the housing cover 16, thus co-defining the course of the air outlet opening 32 in the assembled state. The interior of the clean gas conducting part 310 forms or bounds the effective flow cross section of the clean gas outlet opening 32 of the housing cover 16.

The raw gas inlet 30 comprises at least two raw gas inlet holes 30 which pass through and which are arranged radially outside of an assembly opening 17 (cf. FIGS. 1 to 3) of the housing cover 16. Imaginary axes of the raw gas inlet holes 30 can extend, for example, parallel to the assembly axis 50.

The housing cover 16 is held on the housing corpus 18 by means of a retaining ring 52. The retaining ring 52 is connected by means of a flared connection 54 with the edge of the housing corpus 18.

The axial outside 25 of the lower end plate 24 bounded by the annular trough 24a extends over the main separator element filter medium 23 in the axial direction.

A bottoming of the annular trough-forming section 24a of the outside of the lower end plate 24 sits peripherally connected in the axial direction to a damping ring 56 (cf. FIGS. 1 and 3). The damping ring 56 is supported on the axially opposite side on an inner side of the housing cover 16. The damping ring 56 is coaxial with the assembly axis 50. It serves inter alia to reduce noise as a so-called rattle guard. It restricts the axial movability of the filter insert 20 in the housing 16, 18 and thus prevents rattling noises. The damping ring 56 can further serve as tolerance compensation and/or as damping for operational vibrations or oscillations.

The housing cover 16 is substantially circular. It is coaxial with the assembly axis 50. In its center, the housing cover 16 has a coaxial assembly opening 17 (cf. FIGS. 1 to 3) for the connection nipple 300, 310. A radially inner peripheral wall of the housing cover 16 surrounding the assembly opening 17 is equipped with an inner thread. The inner thread mates with a corresponding outer thread on the radially outer peripheral side of the connecting element 300 of the connection nipple 300, 310.

Figure 2:
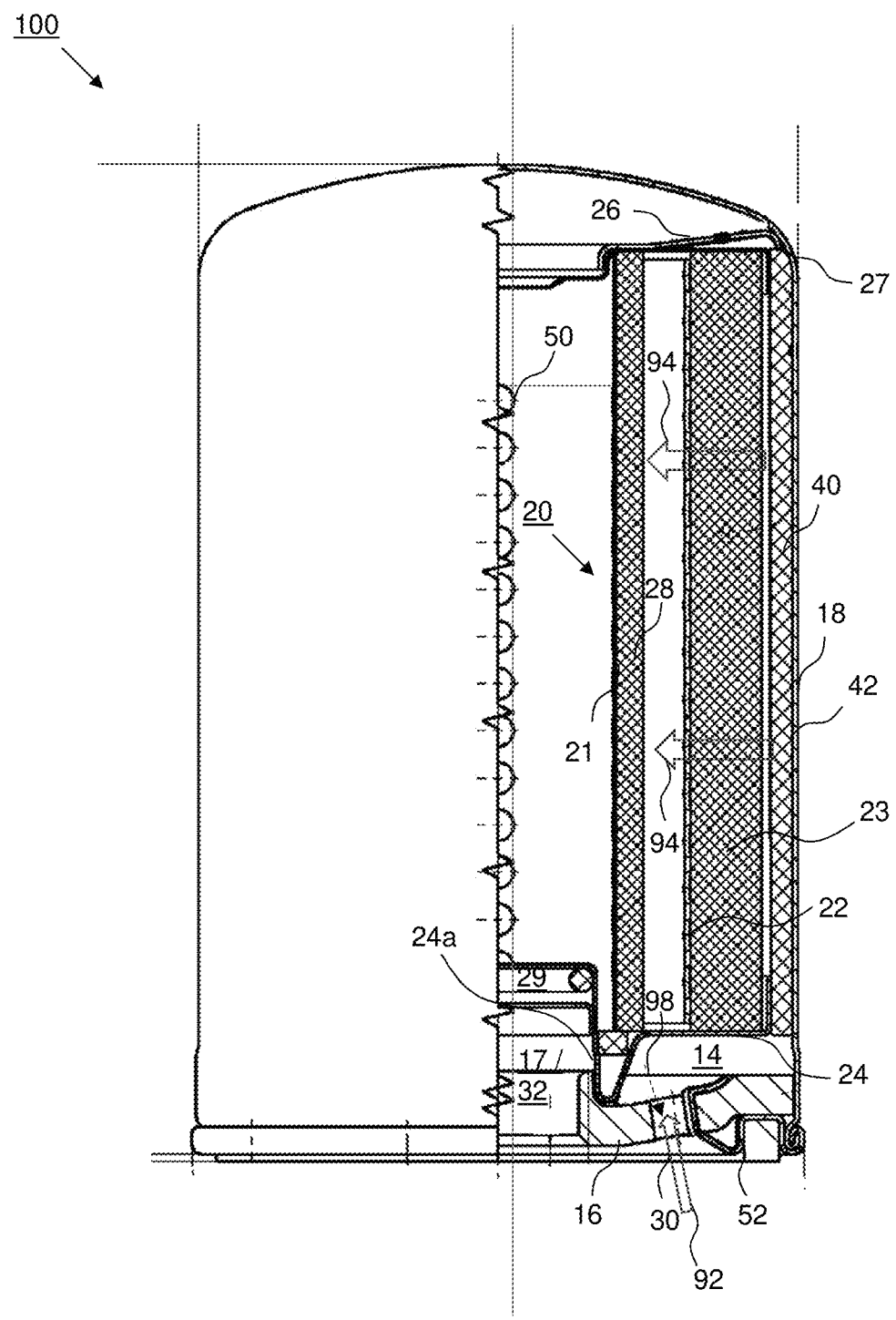
FIG. 2 shows a longitudinal section of the separation device of FIG. 1.

During operation of the separation device 100, 100', air, which can be loaded with oil droplets, flows from an air inlet line of the connector head 200 through the air inlet holes 30, indicated by an arrow 92 in FIGS. 2, 3 and 6, into an inlet chamber of the housing (16, 18). The lower part of the inlet chamber is located in the housing (16, 18) between the lower end plate 24 and the housing cover 16 and extends circumferentially radially outward about the filter insert 20.

The air flows through the filter medium of the preliminary separator element 40 from radially outward to radially inward, indicated by arrow 94 (cf. FIGS. 2, 3 and 6).

The oil droplets are particularly deposited on the radially inner circumferential side of the preliminary separator element 40 as well as on the radially outer circumferential side of the radially outer peripheral wall element 25 of the lower end plate 24. These oil droplets flow downward following gravity and collect at a raw side collecting area 14.

The separated oil droplets collected in the raw side collecting area 14 pass through the raw gas inlet 30, indicated in FIGS. 1 to 3 and 5 by dashed arrows 98, into an air/oil outlet channel 222 (cf. FIGS. 1 and 5) of the connector head 200.

Alternatively (not shown) the separated oil droplets can flow to an oil outlet channel 220 of the connector head 200 via the clean side collecting area 12 and the coaxial fluid outlet 34 of the connection nipple 300, 310. In this alternative embodiment, there is a bypass-connection, for example, by means of openings 58 of the first end disc 24, as depicted in FIG. 6, between the raw side collecting area 14 and the clean side collecting area 12.

In the spin-on air de-oiling box 100, 100' depicted in FIGS. 1 to 5, the pretreated air flows through the filter medium 23 of the main separator element as well as through the filter medium of the secondary separator element 28. The oil droplets having been separated by the main separator coalescing element 23 and the oil droplets having been separated by the secondary separator element 28 flow downward following gravity and collect at the clean side collecting area 12.

The oil droplets collected in the clean side collecting area 12 pass through the coaxial fluid outlet 34 of the connection nipple 300, 310 and into the oil outlet channel 220 of the connector head 200. The separated oil droplets can flow, for example, to the oil outlet channel 220 of the connector head 200 via the coaxial fluid outlet 34 of the connection nipple 300 (cf. FIGS. 1, 5, 6) or the inner thread of the radially inner peripheral wall of the housing cover 16 surrounding the assembly opening 17 (not shown) or at least one oil outlet hole (not shown) of the housing cover 16.

The air, free of oil droplets, flows in the clean air side through the central air outlet opening 320 in the inner space of the nipple 310 out of the separation device 100, 100' and enters an air outlet channel 210 of the connector head 200.

The gas having been supplied to the oil separation device 100, 100' depicted in FIGS. 1 to 5 is guided within the housing 16, 18 of the separation device 100, 100' first through the preliminary separator element 40. Thus, the main separator element is supplied with pre-filtered gas. This leads to the advantage that the residual oil content of the clean air is highly decreased compared to oil separation devices without preliminary separator element.

The second embodiment of the separation device 100' according to the present invention (cf. FIG. 5) differs from the first embodiment of the separation device 100 according to the present invention (cf. FIGS. 1 to 4) only in that it additionally comprises a further preliminary separator element 44. This further preliminary separator element 44 is arranged in the flow path of the gas stream between the raw gas inlet 30 and the preliminary separator element 40, in particular between the housing cover 16 and the first end disc 24. The fluid being separated by the preliminary separator element 40 and/or by the further preliminary separator element 44 drains through the further preliminary separator element 44 and then flows via the raw gas inlet 30 back to the connector head 200, especially to raw gas inlet 222.

Figure 5:
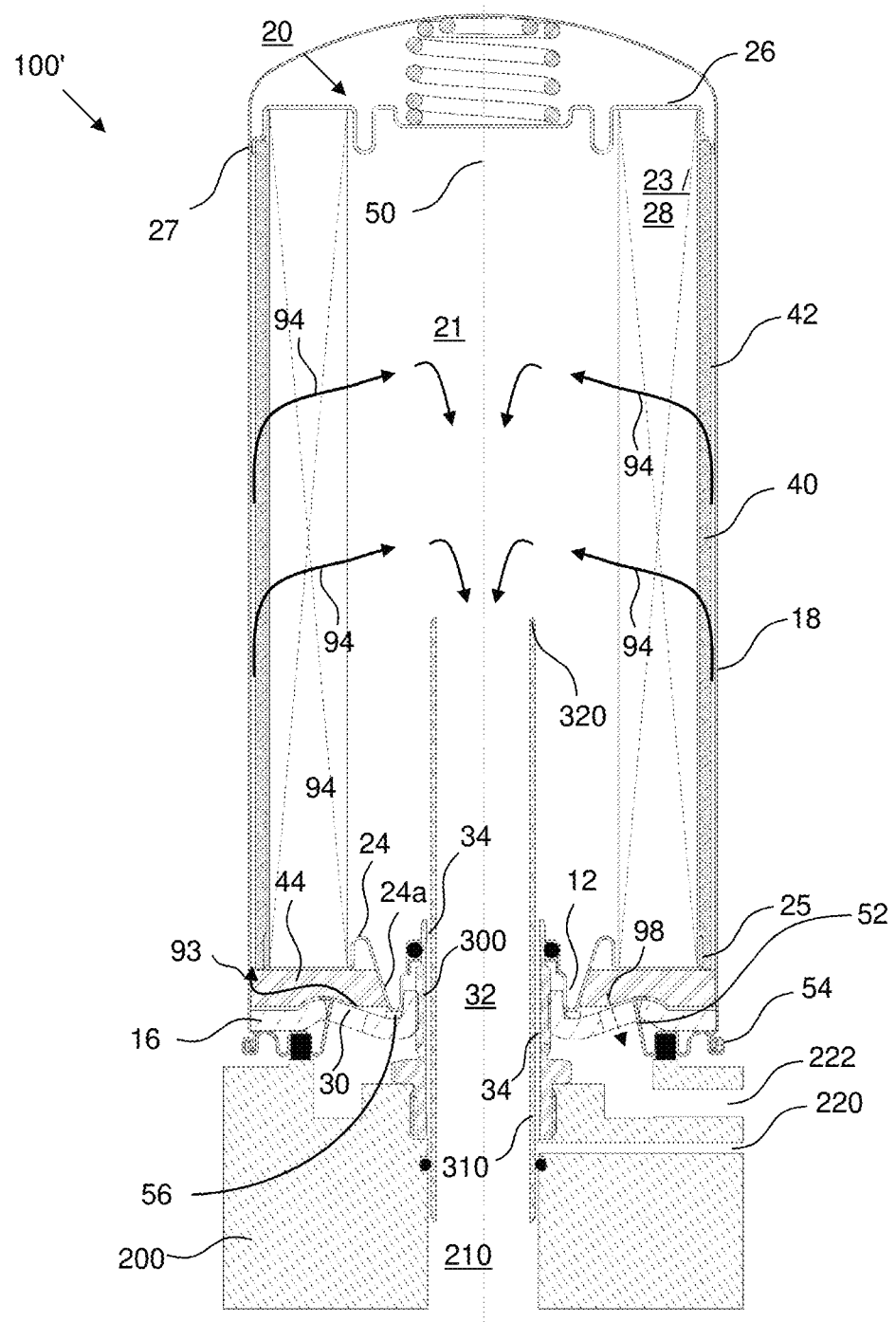
FIG. 5 shows a second exemplary embodiment of an oil separating air filter assembly comprising a separation device according to a second exemplary embodiment of the present invention, wherein the separation device is working according to the method of the present invention.

The second embodiment of the oil separating air filter assembly depicted in FIG. 5 differs from the first embodiment of the oil separating air filter assembly depicted in FIG. 1 only in that it comprises the second embodiment of the separation device 100' instead of the first embodiment of the separation device 100.

FIG. 6 shows an oil separating air filter assembly 100" according to prior art without preliminary separator element.

REFERENCE NUMBERS

12 clean side collecting area for collecting, under the influence of gravity, fluid being separated by the main separator element 22, 23 and/or by the secondary separator element 28, wherein the clean side collecting area is arranged inside the housing 16, 18 at a geodetic lower area and is arranged at the clean side of the housing 16, 18

14 raw side collecting area for collecting under the influence of gravity fluid being separated by the preliminary separator element 40, wherein the raw side collecting area is arranged inside the housing 16, 18 at a geodetic lower area and is arranged at the raw side of the housing 16, 18, in particular is arranged at an inner side of the housing cover 16 being arranged at the raw side of the housing 16, 18

16 housing cover or lid, in particular threaded plate, for example, threaded cover plate 17 assembly opening of the housing cover 18 cup-shaped or cylindrical corpus or housing vessel of the housing of the separation device 100

20 cylindrical filter insert 21 element interior of the filter insert 20.

22 ring-shaped support body of a main separator element 23 hollow cylindrical or ring-shaped coalescing filter medium of the main separator element, in particular made of glass fiber 24 first end disc or lower end plate of the cylindrical filter insert 20

24a annular trough of the first end disc 24

25 radially outer peripheral wall element of the first end disc 24 or axial outside of the first end disc 24

26 second end disc or upper end plate of the cylindrical filter insert 20

27 radially outer peripheral wall element of the second end disc 26

Figure 4:
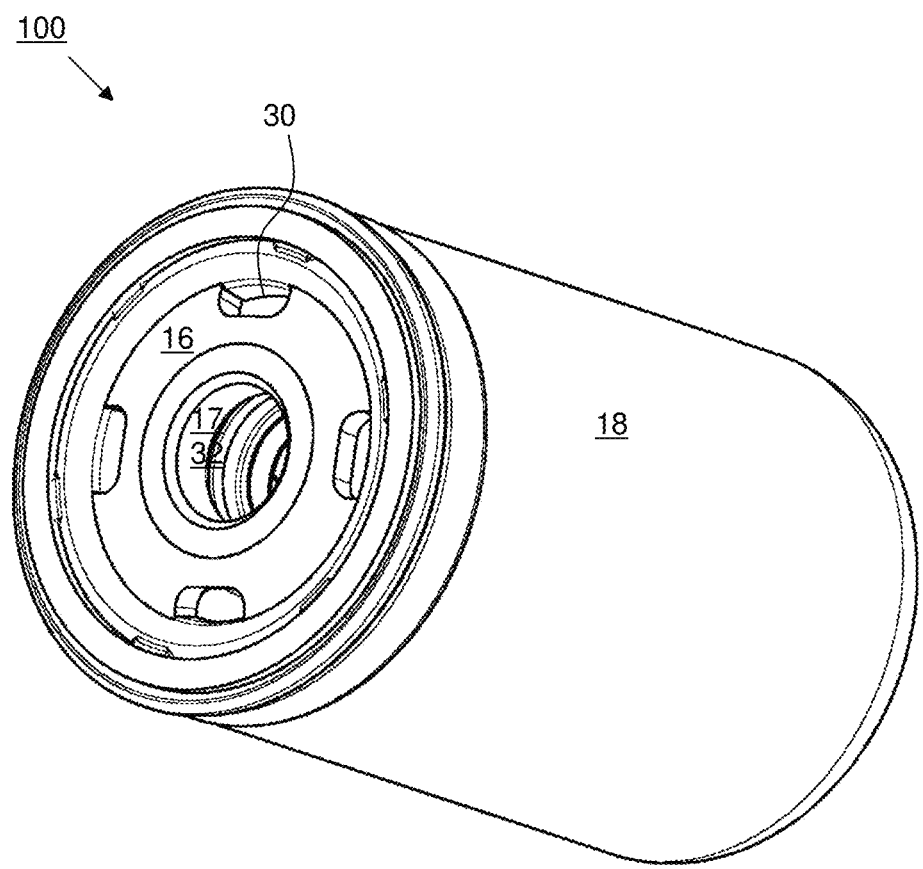
FIG. 4 shows an isometric view of the separation device of FIG. 1.

28 further filter medium of the filter insert 20, in particular secondary separator element (cf. FIGS. 3, 4)

29 pass-through opening of the first end disc 24 (cf. FIGS. 2, 3)

30 raw gas inlet 32 clean gas outlet 34 fluid outlet for fluid being separated by the coalescing filter medium of the main separator element 22, 23 and/or of the secondary separator element 28

40 preliminary separator element, in particular hollow cylindrical coalescing filter medium, for example, hollow cylindrical mat of fibers or fibrous nonwoven fabric, for example made of polyester, the preliminary separator element being arranged concentrically to the main separator element 22, 23

42 gap between the radial wall of the housing corpus 18 and the preliminary separator element 40, in particular annular gap between housing corpus 18 and preliminary separator element 40

44 further preliminary separator element, in particular mat of fibers or fibrous nonwoven fabric, for example, made of polyester, the further preliminary separator element being arranged in the flow path of the gas stream between the raw gas inlet 30 and the filter insert 20, in particular being arranged between the housing cover 16 and the first end disc 24 (cf. FIG. 5)

50 axis, in particular an assembly axis, extending longitudinally through the housing corpus 18

52 retaining ring for holding the housing cover 16 on the housing corpus 18

54 flared connection 56 damping ring 58 openings of the first end disc 24 (cf. FIG. 6)

92 gas inlet flow 93 gas flow through the further preliminary separator element 44 (cf. FIG. 5)

94 gas flow through the filter insert 20

98 dashed arrow indicating separated oil droplets collected in the raw side collecting area 14 passing through the raw gas inlet 30 (cf. FIGS. 1 to 3)

100 separation device of the first embodiment (cf. FIGS. 1 to 4), in particular spin-on separation device or spin-on filter or air de-oiling element or air/oil separator box or air/oil separator element, for separating fluid, in particular oil, from a gas stream, in particular from an air stream, for example from a compressed air stream, of a connecting device 100' separation device of the second embodiment (cf. FIG. 5), in particular spin-on separation device or spin-on filter or air de-oiling element or air/oil separator box or air/oil separator element, for separating fluid, in particular oil, from a gas stream, in particular from an air stream, for example, from a compressed air stream, of a connecting device 100" separation device according to prior art (cf. FIG. 6)

200 connector head of a connecting device, in particular of a compressor, a compressed air system or a vacuum pump 210 air outlet channel of the connector head 220 oil outlet channel of the connector head 200 for oil being separated by the filter medium 23 of the main separator element and/or by the secondary separator element 28, in particular first oil outlet channel of the connector head 200

222 raw gas inlet and oil outlet channel of the connector head 200 for oil being separated by the preliminary separator element 40 and optionally by the further preliminary separator element 44

222" raw gas inlet of the connector head 200 of the separation device 100" according to prior art 300 connecting element, in particular threaded pipe stub, for connecting the separation device 100, 100' with the connector head 200

310 clean gas conducting element, in particular nipple or tube, for conducting clean gas from the separation device 100; 100'; 100" to the connector head 200 of the connecting device 320 central air outlet opening of the clean gas conducting element 310

What is claimed is:

1. A separation device for separating a fluid from a gas stream deriving from a connecting device, the separation device comprising:
   a housing configured to be replaceably connected to a connector head of the connecting device,
   wherein the housing comprises
   a cup-shaped housing corpus and
   a housing cover covering an axial end of the housing corpus,
   wherein the housing cover is non-detachably connected to the housing corpus,
   wherein an axis extends longitudinally through the housing corpus and defines an axial direction;
   a hollow cylindrical filter insert received in the housing in a flow path of the gas stream extending from at least one raw gas inlet of the housing to at least one clean gas outlet of the housing, wherein the hollow cylindrical filter insert comprises
at least one main separator element,
wherein the at least one main separator element comprises
a ring-shaped support body and
further comprises at least one hollow cylindrical coalescing filter medium comprising
at least one coalescer material configured to remove the fluid from the gas stream;
at least one preliminary separator element arranged concentrically to the at least one main separator element in the housing in the flow path of the gas stream between the raw gas inlet of the housing and the at least one main separator element,
wherein the at least one preliminary separator element comprises
a hollow cylindrical coalescing filter medium comprising
at least one coalescer material configured to remove the fluid from the gas stream;
wherein the hollow cylindrical filter insert further comprises
at least one first end disc disposed at a first axial end face side of the hollow cylindrical filter insert and
further comprises at least one second end disc disposed at a second axial end face side of the hollow cylindrical filter insert,
wherein the at least one first end disc faces the housing cover and the at least one second end disc faces away from the housing cover,
wherein the at least one first end disc comprises
a radially outer peripheral wall element surrounding the at least one main separator element and extending over an area of the at least one main separator element in the axial direction, and
wherein the at least one preliminary separator element is disposed with regard to the axis radially outward from the radially outer peripheral wall element of the at least one first end disc.

2. The separation device according to claim 1, wherein the at least one preliminary separator element is a part of the hollow cylindrical filter insert and
wherein the at least one preliminary separator element and the at least one main separator element are arranged in succession in a direction of flow of the gas stream.

3. The separation device according to claim 1, wherein the at least one coalescer material of the at least one preliminary separator element is a nonwoven filter material.

4. The separation device according to claim 1, wherein the at least one preliminary separator element abuts against the radially outer peripheral wall element of the at least one first end disc such that the at least one preliminary separator element is elastically fixed at the radially outer peripheral wall element of the at least one first end disc.

5. The separation device according to claim 1, wherein the at least one hollow cylindrical coalescing filter medium of the at least one main separator element separates the housing into a raw side, where a raw gas containing the fluid is located, and a clean side, where a clean gas having been cleaned from the fluid is located,
wherein the at least one raw gas inlet is arranged at the raw side of the housing and
the at least one clean gas outlet is arranged at the clean side of the housing,
wherein the at least one raw gas inlet and the at least one clean gas outlet are arranged at the housing cover,
wherein the at least one preliminary separator element is configured to be flowed through radially by the gas stream, and wherein a gap is formed between a radial wall of the housing corpus and the at least one preliminary separator element.

6. The separation device according to claim 5, wherein the at least one preliminary separator element is configured to be flowed through from radially outward to radially inward by the gas stream.

7. The separation device according to claim 5, wherein the housing comprises
at the raw side of the housing at least one raw side collecting area configured to collect, by gravity, the fluid separated by the at least one preliminary separator element,
wherein the fluid collected at the raw side collecting area flows by gravity through at least one fluid outlet arranged at the raw side of the housing out of the separation device.

8. The separation device according to claim 7, wherein the at least one raw gas inlet is the at least one fluid outlet.

9. The separation device according to claim 5, wherein the housing comprises
at the clean side of the housing at least one clean side collecting area configured to collect by gravity the fluid separated by the at least one main separator element and
wherein the fluid collected at the clean side collecting area flows by gravity out of the separation device through at least one fluid outlet arranged at the clean side of the housing.

10. The separation device according to claim 9, wherein the at least one fluid outlet is arranged at the at least one clean gas outlet.

11. The separation device according to claim 1, wherein the housing cover is configured to be replaceably mounted on a connecting part configured to connect the separation device with the connecting device.

12. The separation device according to claim 7, wherein the at least one clean gas outlet is a central threaded hole of the housing cover,
wherein the connecting part is a threaded pipe stub that is firmly fixable on the connector head of the connecting device,
wherein the threaded hole is configured to be screwed onto the threaded pipe stub.

13. The separation device according to claim 1, further comprising
at least one secondary separator element arranged concentrically to the at least one coalescing filter medium of the at least one main separator element,
wherein the at least one coalescing filter medium of the at least one main separator element and the at least one secondary separator element are arranged in succession in the flow path of the gas stream.

14. The separation device according to claim 13, wherein the at least one secondary separator element is a filter medium.

15. An oil separating air filter assembly comprising:
a separation device according to claim 1;
at least one connecting part arranged within the at least one clean gas outlet of the separation device,
wherein the at least one connecting part comprises
at least one connecting element configured to connect the separation device with the connector head of the connecting device;
at least one clean gas conducting element comprising
at least one gas-conducting inner space configured to conduct clean gas from a clean side of the separation device to the connector head of the connecting device.

16. The oil separating air filter assembly according to claim 15, wherein
the at least one connecting element is a threaded pipe stub and
wherein the at least one clean gas conducting element is a nipple or a tube.

17. A method for separating a fluid from a gas stream, the method comprising:
(i) passing the gas stream to be separated from the fluid into a housing of a separation device through at least one raw gas inlet of the housing, the housing being replaceably connectable with a connector head of a connecting device;
(ii) passing the gas stream in the housing radially through at least one preliminary separator element arranged between the at least one raw gas inlet of the housing and at least one main separator element in a flow path of the gas stream,
wherein the at least one preliminary separator element is a coalescer configured to remove the fluid from the gas stream,
(iii) after passing through the preliminary separator element, guiding the gas stream radially through the at least one main separator element, arranged in the housing between the at least one preliminary separator element and at least one clean gas outlet of the housing in the flow path of the gas stream and separating the housing into a raw side and a clean side;
(iv) collecting by gravity the fluid separated by the at least one preliminary separator element at a raw side collecting area arranged at the raw side of the housing inside the housing at a geodetic lower area;
(v) the fluid collected at the raw side collecting area flowing by gravity through at least one fluid outlet arranged at the raw side of the housing out of the separation device;
(vi) collecting the fluid separated by the at least one main separator element by gravity at a clean side collecting area arranged at the clean side of the housing inside the housing at a geodetic lower area;
(vii) the fluid collected at the clean side collecting area flowing by gravity out of the separation device through at least one fluid outlet arranged at the clean side of the housing,
wherein the at least one main separator element is a coalescer configured to remove the fluid from the gas stream.

18. The method according to claim 17, wherein
the at least one fluid outlet arranged at the raw side of the housing is the at least one raw gas inlet.

* * * * *